United States Patent
Yang

(10) Patent No.: US 8,579,087 B2
(45) Date of Patent: Nov. 12, 2013

(54) LUBRICANT GREASE CHARGING-UP DEVICE FOR AUTOMOBILE BRAKE HUB BEARING

(75) Inventor: Yu Yang, Anhui (CN)

(73) Assignee: Chery Automobile Co., Ltd., Anhui (CN)

(*) Notice: Subject to any disclaimer, the term of this patent is extended or adjusted under 35 U.S.C. 154(b) by 750 days.

(21) Appl. No.: 12/741,181

(22) PCT Filed: Oct. 31, 2008

(86) PCT No.: PCT/CN2008/072896
§ 371 (c)(1),
(2), (4) Date: Jul. 20, 2010

(87) PCT Pub. No.: WO2009/071014
PCT Pub. Date: Jun. 11, 2009

(65) Prior Publication Data
US 2010/0294596 A1 Nov. 25, 2010

(30) Foreign Application Priority Data
Nov. 7, 2007 (CN) .......................... 2007 1 0135379

(51) Int. Cl.
*F16C 33/66* (2006.01)
(52) U.S. Cl.
USPC .......................................................... 184/5.1
(58) Field of Classification Search
USPC ............... 184/5.1, 13.1, 38.1, 105.1; 384/474
See application file for complete search history.

(56) References Cited

U.S. PATENT DOCUMENTS

| 1,505,776 A | 8/1924 | Glade, Jr. |
| 2,369,173 A | 2/1945 | Purris et al. |
| 4,190,133 A | 2/1980 | Ploeger |

(Continued)

FOREIGN PATENT DOCUMENTS

| CN | 2196571 Y | 5/1995 |
| CN | 1505494 A | 6/2004 |

(Continued)

OTHER PUBLICATIONS

Extended European Search Report of Application No. 08857482.7, mailed on Sep. 17, 2012, 7 pages.

(Continued)

*Primary Examiner* — William E Dondero
*Assistant Examiner* — Robert T Reese
(74) *Attorney, Agent, or Firm* — Kilpatrick Townsend & Stockton LLP

(57) ABSTRACT

A lubricating grease charging device for automobile brake hub bearings include an operation spindle (10), an outer diameter of an upper body section thereof being slightly smaller than an inner diameter of an outer bearing (60) of the automobile brake hub (50), and an outer diameter of lower body section thereof being slightly smaller than an inner diameter of an inner bearing (70) of the automobile brake hub (50); the operation spindle (10) being provided in an outer bearing chamber and an inner bearing chamber of the automobile brake hub as well as in a cavity between the outer bearing chamber and the inner bearing chamber; a first closing member and a second closing member, which close a space in which the operation spindle (10) is disposed at two ends respectively; a lubricating grease charging passage, through which lubricating grease can be charged into the space in which the operation spindle (10) is disposed.

7 Claims, 4 Drawing Sheets

(56) References Cited

U.S. PATENT DOCUMENTS

| | | | | |
|---|---|---|---|---|
| 4,405,035 | A | * | 9/1983 | Shultz .......................... 184/5.1 |
| 5,658,053 | A | | 8/1997 | Vencill et al. |
| 5,720,372 | A | | 2/1998 | Shino et al. |
| 5,782,318 | A | * | 7/1998 | Ng ................................ 184/5.1 |
| 5,904,427 | A | | 5/1999 | Braun et al. |
| 6,454,051 | B1 | * | 9/2002 | Okayasu ...................... 184/13.1 |
| 6,533,363 | B1 | * | 3/2003 | Hayes et al. ................ 301/105.1 |
| 2002/0084145 | A1 | * | 7/2002 | Lannan .......................... 184/5.1 |
| 2002/0142264 | A1 | | 10/2002 | Metrikin |
| 2006/0287152 | A1 | | 12/2006 | Bishop et al. |

FOREIGN PATENT DOCUMENTS

| | | |
|---|---|---|
| CN | 101158380 A | 4/2008 |
| CN | 201237073 Y | 5/2009 |
| EP | 1 103 662 A1 | 5/2001 |
| JP | 59170522 A | 9/1984 |
| JP | 2001027262 A | 1/2001 |

OTHER PUBLICATIONS

International Search Report and Written Opinion for PCT/CN2008/072896 mailed Feb. 5, 2009.

\* cited by examiner

LUBRICANT GREASE CHARGING-UP DEVICE FOR AUTOMOBILE BRAKE HUB BEARING

The present invention claims benefit of CN application No. 200710135379.7 titled "A LUBRICATING GREASE CHARGING DEVICE FOR AUTOMOBILE BRAKE HUB BEARING", filed with the Chinese State Intellectual Property Office on Nov. 7, 2007. The entire disclosure thereof is incorporated herein by reference.

FIELD OF THE INVENTION

The present invention relates to an automobile manufacture field, and more specifically, to a lubricating grease charging device for automobile brake hub bearings.

BACKGROUND OF THE INVENTION

In current lubricating grease charging of automobile brake hub bearings, typically, both inner and outer bearings are charged with lubricating grease manually or mechanically, then the grease storage area in the bearing chamber is smeared with lubricating grease manually and appropriately, and finally the bearings are press-fitted into the brake hub; or the outer bearing may be press-fit into the brake hub first, then the grease storage area in the bearing chamber is smeared with lubricating grease manually and appropriately, and finally the inner bearing is press-fitted into the brake hub.

When the grease storage area in the bearing chamber is smeared with lubricating grease manually, it is difficult to control the charging space and charging amount. And the manual charging method causes bad time and energy efficiency in production line operation. Further, if the operation is conducted completely by manual labor, beside the uncertainty of charging quality and production period, the working condition of workers is also hard, especially in winter when the cold stimulation of grease is unendurable for fingers.

SUMMARY OF THE INVENTION

The technical problem to be solved by the present invention is to provide a lubricating grease charging device for automobile brake hub bearings that has a simple structure, relatively short operation period and high charging control precision, and is easy to be manufactured and maintained.

To solve the above described technical problem, the present invention provides a lubricating grease charging device for automobile brake hub bearings including: an operation spindle, an outer diameter of an upper body section thereof being slightly smaller than an inner diameter of an outer bearing of the automobile brake hub, and an outer diameter of lower body section thereof being slightly smaller than an inner diameter of an inner bearing of the automobile brake hub; the operation spindle being provided in an outer bearing chamber and an inner bearing chamber of the automobile brake hub as well as in a cavity between the outer bearing chamber and the inner bearing chamber; a first closing member and a second closing member, which close a space in which the operation spindle is disposed at two ends respectively; a lubricating grease charging passage, through which lubricating grease can be charged into the space in which the operation spindle is disposed.

Preferably, the first closing member is a gland for closing an opening of the outer bearing chamber; the lubricating grease charging passage includes a pipe joint provided in the gland, so as to charge the lubricating grease into the space in which the operation spindle is disposed through the pipe joint; the second closing member is a supporting platform at a bottom of the operation spindle.

Preferably, a lower part of the gland is provided with a boss protruding downwardly, which has an inner hole communicated with the pipe joint; the gland is inserted into the outer bearing chamber via the boss.

Preferably, a sealing ring is provided at a contact portion between the gland and the automobile brake hub.

Preferably, the lubricating grease charging device for automobile brake hub bearings further includes at least two clamping mechanisms so as to press the gland against the automobile brake hub symmetrically.

Preferably, the operation spindle further includes lubricating grease recovering holes therein, inner ends of the lubricating grease recovering holes are communicated with the cavity in which the operation spindle is disposed, and outer ends of the lubricating grease recovering holes are communicated with a lubricating grease recovering device.

Preferably, the supporting platform includes a chamfer surface facing lateral-upper side, the inner ends of the lubricating grease recovering holes are located on the chamfer surface, and the outer ends of the lubricating grease recovering hole are located in a counterbore at the bottom of the operation spindle.

Preferably, number of the lubricating grease recovering holes ranges from 6 to 16, and the lubricating grease recovering holes are evenly arranged on the operation spindle in a circumferential direction; the lubricating grease recovering holes have a diameter ranging from 3 mm to 5 mm.

Preferably, an upper portion of the operation spindle has a spherical shape and is closed.

Preferably, the operation spindle includes a central cavity extending in its axial direction and having an upward opening, the central cavity is communicated with the space in which the operation spindle is disposed through a communicating hole.

The present invention mainly provides components including operation spindle, gland, etc. The brake hub which has been press-fitted with bearings and oil seal is mounted onto the operation spindle secured to the bottom plate. Then, the gland provided with an O-ring at bottom part and connected with a lubricating grease charging hose is covered onto the brake hub. The lubricating grease charging system is started. Due to the fact that related journals of the operation spindle are clearance fitted with the inner diameter of bearings and the oil seal, the lubricating grease charged from the upper part of the operation spindle will progress along a passage formed between the operation spindle, the bearings, and the brake hub provided with oil seal, that is, from the outer bearing to the grease storage area in bearing chamber, and then to the inner bearing. The charging of lubricating grease will be completed generally in about a few seconds, and a predetermined amount of lubricating grease will be charged into both bearings and the grease storage area in the bearing chamber.

The lubricating grease charging device for fixing chamber provided in this invention is particularly suitable for production line operation of assembling line of automobile chassis, because it has advantages such as short operation period, precise control in charging space, simple structure, ease in manufacturing and maintaining.

BRIEF DESCRIPTION OF THE DRAWINGS

Hereinafter a further detailed description of the present invention will be made with reference to the accompanied drawings and specific embodiments.

DETAILED DESCRIPTION OF THE INVENTION

First Embodiment

Figure 1:
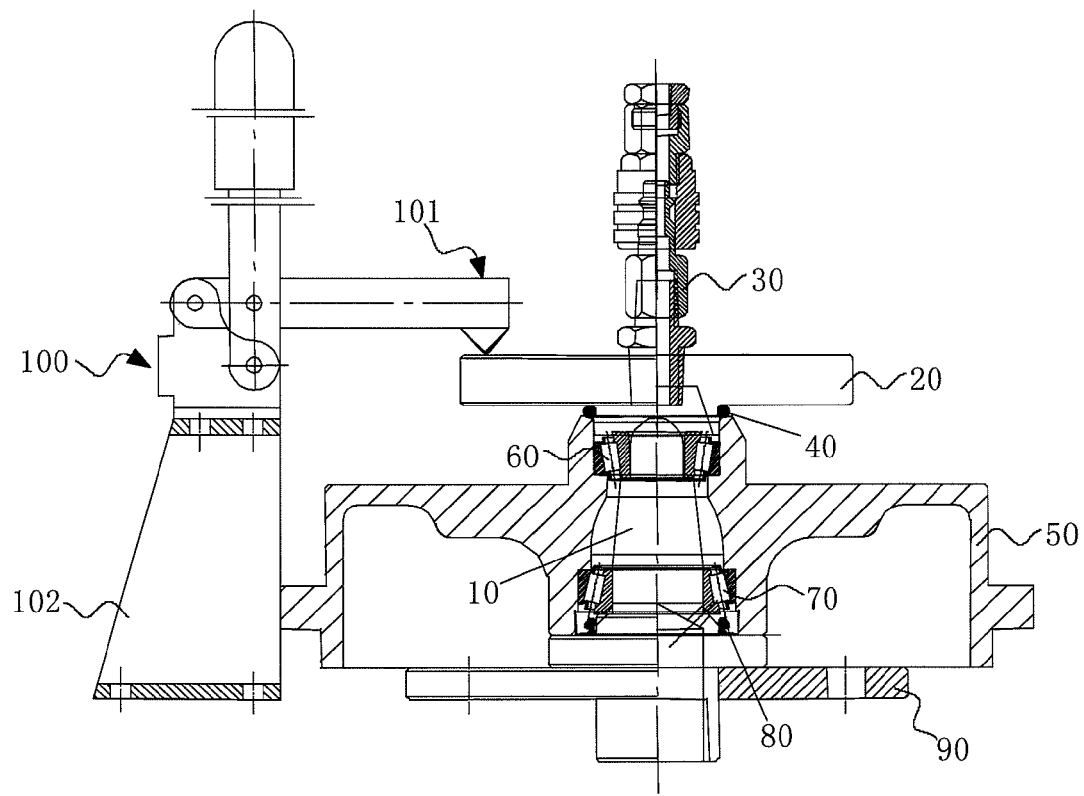
FIG. 1 is a schematic view of the structure according to the present invention.
Figure 2:
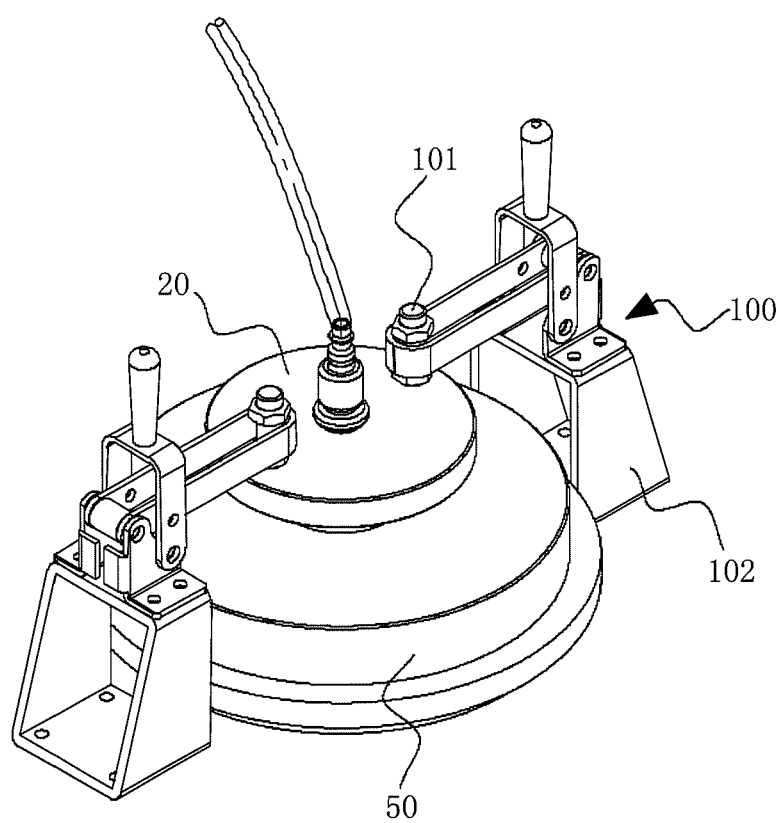
FIG. 2 is a schematic perspective view of the structure according to the present invention.
Figure 3:
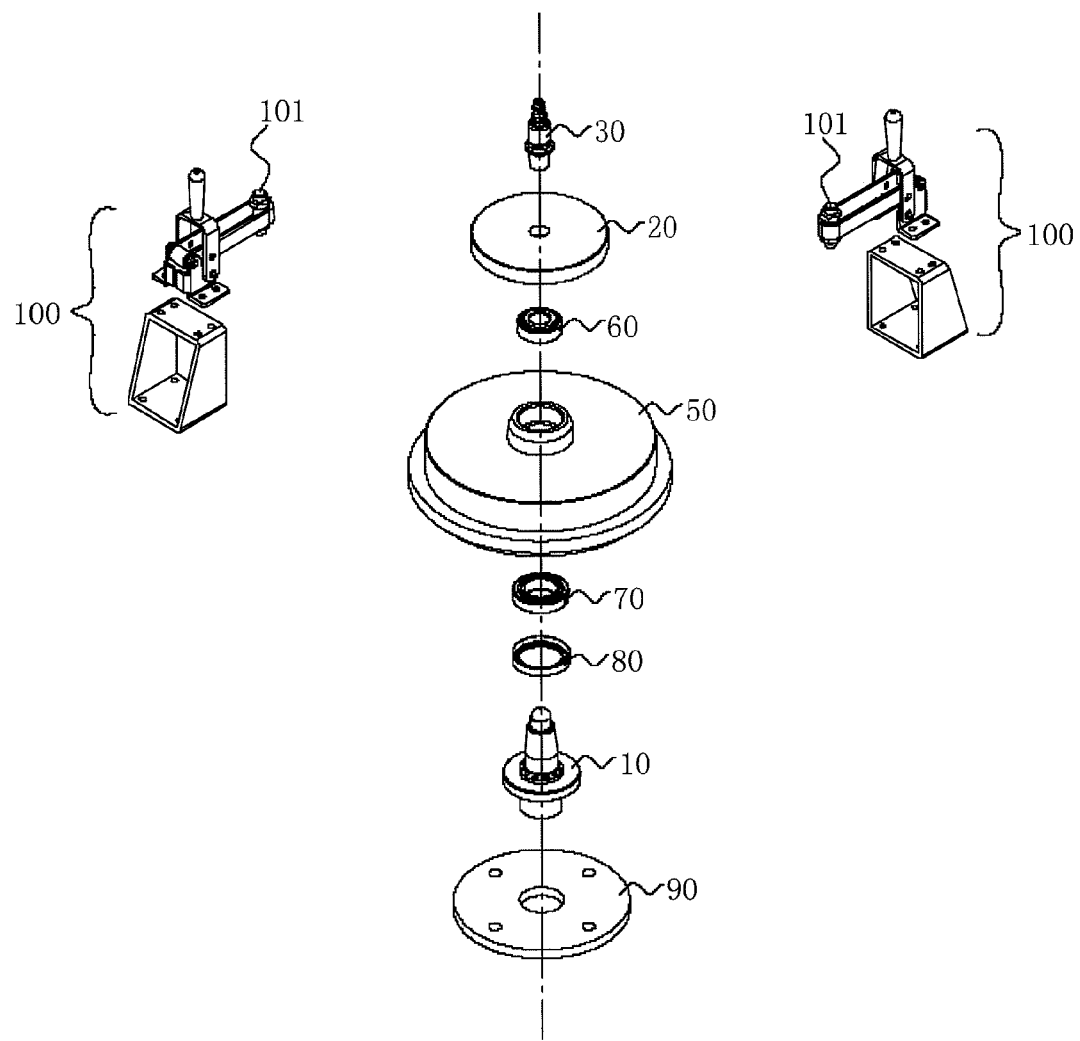
FIG. 3 is a schematic exploded view showing the structure according to the present invention.
Figure 4:
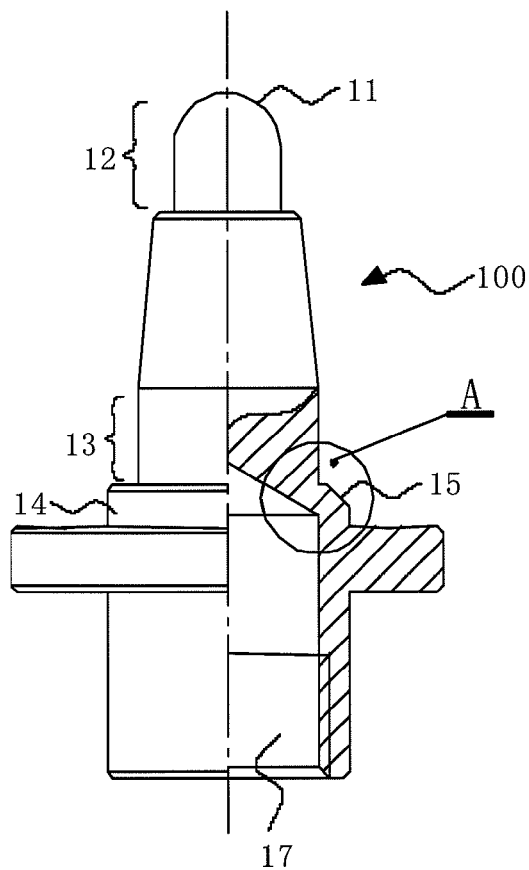
FIG. 4 is a schematic view of the structure of the operation spindle in the present invention.
Figure 5:
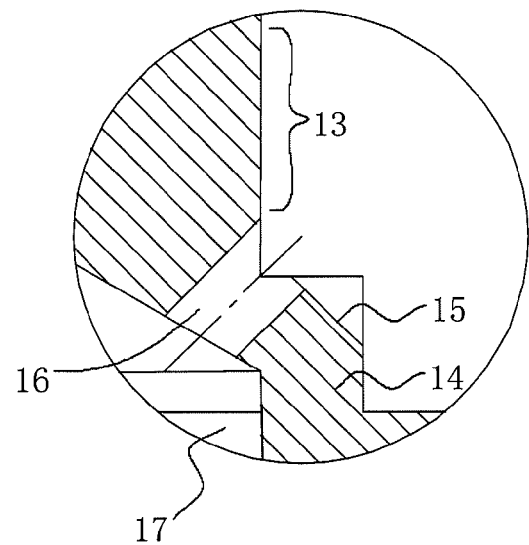
FIG. 5 is a partially enlarged view of portion A in FIG. 4.

The kernel in designing of a lubricating grease charging device for automobile brake hub bearings is the provision of an operation spindle 10, which is required to be designed according to the structure of object to be worked on, and to comply with the space requirement for charging lubricating grease in fixing chamber. Hereinafter the technical solution of the present invention would be described specifically.

With reference to FIGS. 1 to 4, the operation spindle 10 is provided with a body portion and a platform portion, which are fitted with an outer bearing 60 in an outer bearing chamber and an inner bearing 70 in an inner bearing chamber of the brake hub 50, respectively, to achieve positioning. The upper part of the operation spindle 10 is provided with a gland 20 for closing the outer bearing chamber of the brake hub 50, i.e., the gland 20 may function as a first closing member. The lower part of the operation spindle 10 is provided with a bottom plate 90. The middle part of the operation spindle 10 together with the inner wall of brake hub 50 between the outer bearing 60 and inner bearing 70 form a cavity. The gland 20 is provided with a pipe joint 30 which is connected with a lubricating grease charging hose. The pipe joint 30 and the gland 20 are communicated with the space or cavity between the outer bearing 60, the inner bearing 70 and the communication portion of the brake hub 50, constituting a lubricating grease charging passage.

The operation spindle 10 is required to be designed such that the operation spindle 10 may be fitted with the brake hub 50 with the outer bearing 60 and inner bearing 70 assembled, thus on one hand, the operation spindle 10 performs as a support, and on the other hand, the operation spindle 10, together with the brake hub 50 with the outer bearing 60 and the inner bearing 70 assembled, forms the lubricating grease charging passage.

Sealing members for keeping the lubricating grease charging passage hermetic are provided between the gland 20 and the brake hub 50 and between the brake hub 50 and the operation spindle 10. If the charging speed of the lubricating grease is high, a large charging pressure is required. The solution of providing sealing members in joint portions may prevent the lubricating grease from escaping.

The upper end 11 of the operation spindle 10 has a spherical shape. There is a clearance fit between the upper body section 12 in the upper part of the operation spindle 10 and the inner diameter of the outer bearing 60, and between the lower body section 13 in the middle-lower part of the operation spindle 10 and the inner diameter of the inner bearing 70, thus providing lubricating grease passage clearances. The spherical shape of the upper end 11 of the operation spindle 10 is allowed to eliminate the adhesion of lubricating grease while reducing the charging resistance of the lubricating grease.

A chamfer surface 15 having about 45 degree is formed on the operation spindle 10 between the supporting platform 14 fitted with the inner bearing 70 and the supporting surface of an oil seal 80. The chamfer surface 15 is evenly provided with 6 to 16 through holes 16 thereon as lubricating grease recovering passage. The through holes 16 arranged evenly in circumferential direction contribute to the uniform flow of the lubricating grease in abovementioned clearances, thus the lubricating grease may be charged into portions such as the inner bearing, the outer bearing and the grease storage area in the bearing chamber uniformly. The through holes 16 are extended to the lower end of the operation spindle 10. The operation spindle 10 is clearance fitted with the oil seal and the inner diameter of the related bearings. As shown in FIG. 1, the supporting platform 14 for supporting the inner bearing 70 may function as a second closing member for closing the lower opening of the inner bearing chamber. The chamfer surface 15 between the supporting platform 14 and the oil seal 80 may have an angle of 45 degree, so as to provide a clearance serving as the lubricating grease recovering passage.

In the above configuration, the brake hub 50, the outer bearing 60, the inner bearing 70 and the oil seal 80 are objects to be lubricated.

The lower end surface of gland 20 is provided with a boss protruded downwardly by an appropriate length, which is hole-shaped and is communicated with the inner pipe chamber of the pipe joint 30. The boss on the lower end surface of gland 20 is inserted into the outer bearing chamber of brake hub 50 and forms clearance fit therebetween. An O-ring 40 inserted into an arc-shaped groove is provided at the contact portion between the gland 20 and the brake hub 50.

A counterbore 17 is provided at the center portion of the bottom of operation spindle 10, and the through holes 16 provided at chamfer surface 15 are extended downwardly and inwardly and communicated with the counterbore 17. There are 10-14 through holes 16 arranged evenly at chamfer surface 15 in circumferential direction. The diameter of the through holes 16 is ranged from 3 to 5 mm. The counterbore 17 provided in the bottom of operation spindle 10 may recover the escaped lubricating grease directly or by a hose connected thereto, through lubricating grease recovering device.

The present device further includes a clamping mechanism 100 which has quick-action clamps 101 pressing against the gland 20 symmetrically. The tight sealing requirement may be fulfilled by setting and adjusting the quick-action clamps 101. The clamping mechanism 100 includes quick-action clamp bases 102 and the quick-action clamps 101. The bottom plate 90 supports and secures the operation spindle 10 from the bottom.

The operation and working process of this invention would be described in detail with respect to the accompanied drawings.

The brake hub 50 which has been press-fitted with the outer bearing 60, the inner bearing 70 and the oil seal 80 is mounted onto the operation spindle 10 secured to the bottom plate 90. Then, the gland 20 provided with an O-ring in the bottom part is covered onto the brake hub 50. The pipe joint 30 on the gland 20 is connected with the charging hose of the lubricating grease storage and diaphragm pump suction system. The quick-action clamps 101 are turned down to securely press the gland 20 symmetrically. Then, the lubricating grease charging system is started. The lubricating grease suctioned by the diaphragm pump enters at the spherical-shaped end 11 of operation spindle 10, and flows downwardly along the side wall of the operation spindle 10. Due to the fact that the lubricating grease is charged in a closed system, the lubricating grease suctioned may progress only along the clearance passage provided by the operation spindle 10, that is, from the outer bearing 60 to the grease storage area in the bearing chamber, and then to the inner bearing 70. Thereby lubricating grease charging is completed quickly, and in about 5 seconds. All of the inner bearing 70, the outer bearing 60 and grease storage area in bearing chamber are charged with certain amount of the lubricating grease.

Second Embodiment

The operation spindle 10 is provided with a body portion and a platform portion for fitting with and positioning the outer bearing 60 and inner bearing 70 provided on the brake hub 50 respectively. A cavity extending in up and down direction is provided inside the operation spindle 10. The bottom part of the operation spindle 10 is provided with a bottom plate 90. The middle part of the operation spindle 10 is provided with a communicating hole for communicating interior and exterior of the operation spindle 10. The communicating hole is communicated with the cavity enclosed by the inner wall of the brake hub 50 between the outer bearing 60 and the inner bearing 70. The upper or lower end of the operation spindle 10 is provided with a pipe joint 30 connected with lubricating grease. The pipe joint 30 and the cavity in the operation spindle 10 are communicated with the space or the cavity between the outer bearing 60, the inner bearing 70 and the communication portion of the brake hub 50, constituting a lubricating grease charging passage.

There is no difference between the core ideas of above described first and second embodiments. The difference only lies in that the lubricating grease charging passage in the first embodiment runs along the outer wall of the operation spindle 10, while in the lubricating grease charging passage in the second embodiment, the lubricating grease enters the cavity in the operation spindle 10 first, and then into the grease storage area in the bearing chamber, then into the outer bearing 60 and the inner bearing 70. That is, the paths of the charging passages provided are different. The present invention may charge grease-like substance, such as bearing lubricating grease, into one fixing chamber, or a plurality of fixing chambers simultaneously.

What is claimed is:

1. A lubricating grease charging device for automobile brake hub bearings, characterized by comprising:
    an operation spindle, an outer diameter of an upper body section thereof being slightly smaller than an inner diameter of an outer bearing of the automobile brake hub, and an outer diameter of a lower body section thereof being slightly smaller than an inner diameter of an inner bearing of the automobile brake hub; the operation spindle being provided in an outer bearing chamber and an inner bearing chamber of the automobile brake hub as well as in a cavity between the outer bearing chamber and the inner bearing chamber;
    a first closing member and a second closing member, which close a space in which the operation spindle is disposed at two ends respectively;
    a lubricating grease charging passage, through which lubricating grease can be charged into the space in which the operation spindle is disposed; and
    the first closing member is a gland for closing an opening of the outer bearing chamber;
    the lubricating grease charging passage comprises a pipe joint provided in the gland, so as to charge the lubricating grease into the space in which the operation spindle is disposed through the pipe joint;
    the second closing member is a supporting platform at a bottom of the operation spindle; and
    the operation spindle further comprises lubricating grease recovering holes therein, inner ends of the lubricating grease recovering holes are communicated with the cavity in which the operation spindle is disposed, and outer ends of the lubricating grease recovering holes are communicated with a lubricating grease recovering device; and wherein
    the supporting platform comprises a chamfer surface facing lateral-upper side, the inner ends of the lubricating grease recovering holes are located on the chamfer surface, and the outer ends of the lubricating grease recovering hole are located in a counterbore at the bottom of the operation spindle.

2. The lubricating grease charging device for automobile brake hub bearings according to claim 1, wherein a lower part of the gland is provided with a boss protruding downwardly, which has an inner hole communicated with the pipe joint; the gland is inserted into the outer bearing chamber via the boss.

3. The lubricating grease charging device for automobile brake hub bearings according to claim 2, wherein a sealing ring is provided at a contact portion between the gland and the automobile brake hub.

4. The lubricating grease charging device for automobile brake hub bearings according to claim 3, further comprising at least two clamping mechanisms so as to press the gland against the automobile brake hub symmetrically.

5. The lubricating grease charging device for automobile brake hub bearings according to claim 1, wherein number of the lubricating grease recovering holes ranges from 6 to 16, and the lubricating grease recovering holes are evenly arranged on the operation spindle in a circumferential direction; the lubricating grease recovering holes have a diameter ranging from 3 mm to 5 mm.

6. The lubricating grease charging device for automobile brake hub bearings according to claim 1, wherein an upper portion of the operation spindle has a spherical shape and is closed.

7. The lubricating grease charging device for automobile brake hub bearings according to claim 1, wherein the operation spindle comprises a central cavity extending in its axial direction and having an upward opening, the central cavity is communicated with the space in which the operation spindle is disposed through a communicating hole.

\* \* \* \* \*